United States Patent [19]

Navarette

[11] Patent Number: 4,807,520

[45] Date of Patent: Feb. 28, 1989

[54] LINEAR HYDRAULIC MOTOR HAVING A FRANGIBLE PISTON HEAD

[75] Inventor: Carlos A. Navarette, Canoga Park, Calif.

[73] Assignee: Allied Corporation, Morris Township, Morris County, N.J.

[21] Appl. No.: 656,285

[22] Filed: Oct. 1, 1984

[51] Int. Cl.[4] .......... B64C 13/42; F16J 1/00; F15B 13/10

[52] U.S. Cl. .......... 92/146; 92/172

[58] Field of Search .......... 277/215, DIG. 10; 92/146, 223, 224, 234, 235, 236; 91/533, 509; 137/67, 68 R

[56] References Cited

U.S. PATENT DOCUMENTS

| | | | |
|---|---|---|---|
| 3,027,168 | 3/1962 | Herbruggen | 277/215 |
| 3,368,351 | 2/1968 | Wood et al. | 91/509 X |
| 3,884,127 | 5/1975 | Simmons | 91/509 X |
| 4,122,759 | 10/1978 | Runkel et al. | 92/168 |
| 4,211,151 | 7/1980 | Wallischeck | 92/146 |
| 4,449,446 | 5/1984 | Degnan et al. | 92/146 |

OTHER PUBLICATIONS

Figure A—26—4, from R. E. Peterson, "Design Factors for Stress Concentration", *Machine Design,* vol. 23; No. 2, Feb. '51, p. 169; No. 3, Mar. '51, p. 161; No. 5, May '51, p. 159; No. 6, Jun. '51, p. 173; No. 7, Jul. '51, p. 155.

*Primary Examiner*—Robert E. Garrett
*Assistant Examiner*—George Kapsalas
*Attorney, Agent, or Firm*—Robert C. Smith

[57] ABSTRACT

A linear hydraulic motor includes a piston rod of conventional steel carrying a fragible piston head movable in a cylinder, the head being designed to break away in the event the cylinder wall is punctured and deformed such that a portion of the cylinder wall becomes an obstacle in the path of the piston. Two or more such motors are frequently connected redundantly to one control surface such that if one motor is damaged, the other can continue to perform its function. The piston head is of a brittle metallic matrix material and includes a conventional seal groove formed on its cylindrical surface. Each of the opposite faces of the piston head contains a first deep circumferential groove radially outward from the rod, a second shallower circumferential groove positioned radially outward from the first circumferential groove at essentially the same radial position as the bottom of the seal groove, and a large number of radial grooves effectively dividing the faces into truncated sectors outboard of the deep grooves which can break away.

6 Claims, 2 Drawing Sheets

LINEAR HYDRAULIC MOTOR HAVING A FRANGIBLE PISTON HEAD

BACKGROUND OF THE INVENTION

This invention relates to a linear hydraulic motor having a frangible piston head.

A typical linear hydraulic motor includes a cylinder, a rod in the cylinder and a piston attached to the rod including a seal dividing the cylinder into two chambers such that hydraulic fluid may be ported to one chamber or the other to cause the piston to move in a desired direction. In some applications a plurality of such motors may be connected to a particular driven member such as a control surface to provide redundant control. Where such motors may be damaged by ballistic action, one motor may be disabled and another can continue to effect the desired control function so long as the rod in the disabled motor is free to move. It frequently happens, however, that the cylinder wall of the disabled motor is breached in such a way as to cause metal to be deformed into the path of the piston, effectively causing it to be blocked and preventing the viable cylinder from providing the desired control The above problem has been dealt with by constructing the piston in such a way that portions of it can break away when driven into an inwardly projecting metal obstacle. In one prior art design, the piston and rod are made of hardened steel. To provide the desired weakness in the piston, the seal groove is made wider than usual resulting in narrower than usual flanges on the sides of the packing, which flanges are then sawed through in an axial direction to approximately the bottom of the seal groove with a large number of cuts around the periphery of the piston. The resulting piston and rod are then heat treated to enhance the brittleness of the flanges. This arrangement has proved to be less than totally satisfactory because the heat treating tends to cause hydrogen embrittlement of the entire rod and piston assembly which has resulted in premature fracturing of the rod. Should the heat treating be insufficient, the flange sectors may be too strong to fracture as desired. Also, the use of the extra wide seal groove and packing has resulted in a higher incidence and amount of hydraulic fluid leakage than is desirable.

SUMMARY OF THE INVENTION

The hydraulic motor of the invention is characterized in that the rod is of the usual high strength steel and the piston which is formed separately and attached to the rod by any suitable means is of a material chosen to fracture under low strain such as a matrix of approximately 70–75% 6061 aluminum and 25–30% silicon carbide. The piston is of conventional width (thickness) and has a peripheral seal groove of conventional dimensions. Deep circumferential grooves are formed on both sides of the piston, at a radius well within its outside diameter. In one such exemplary piston, this circumferential groove was significantly less than half the distance between the rod and the outside diameter. A plurality of radial grooves are formed in each piston face extending outwardly of the deep circumferential grooves and an additional coaxial circumferential groove of about the same depth as the radial grooves is formed in each face of the piston at essentially the same radial distance as the bottom of the seal groove. The pattern of grooves is preferably identical on each side of the piston with corresponding grooves directly opposite each other. In the event that there is a deformation or petalling of the cylinder wall inwardly which would tend to block the piston from moving along with another piston in a cylinder in tandem with it, the blocked piston will be exposed to the full hydraulic power of the system which will be exerted between the deformed portion of the cylinder wall and the portion of the cylinder in contact therewith. This force will either push the deformed or petalled metal out of the way of the piston or will cause the piston to break off in pieces having the form of truncated sectors, thus freeing the piston and rod to move past the obstacle. With the structure thus far described, the seal and groove dimensions are standard so that in normal operation leakage is only what is experienced normally. The rod is of conventional high strength steel and has no unusual heat treatment which would tend to cause it to fail prematurely. And the piston, being separately formed of a known metal matrix material, will fracture in a reasonably predictable manner so that the purpose of supplying redundant hydraulic motors is not frustrated.

From the foregoing it will be appreciated that applicant's design affords the advantages that (1) the fracture characteristics of the piston are reasonably predictable and reliable, (2) since the seal is conventional, it has no tendency to leak beyond that of a conventional piston and cylinder arrangement, and (3) there is no likelihood that the piston rod will fail prematurely because of hydrogen embrittlement.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
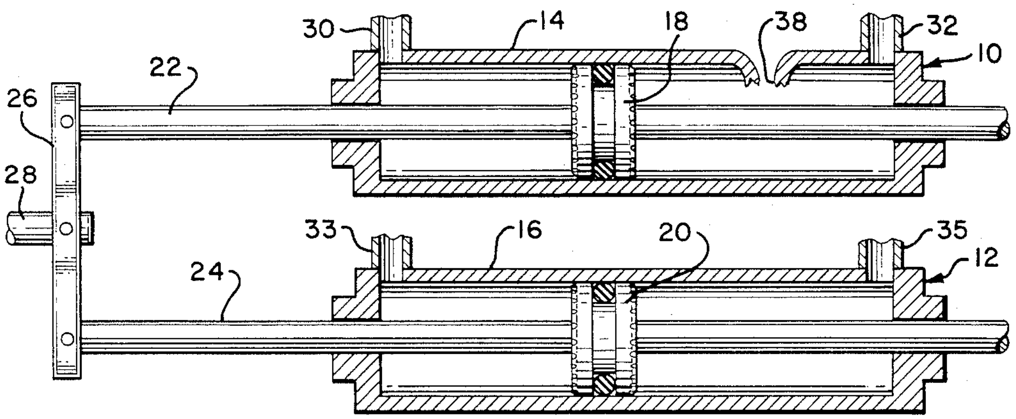
FIG. 1 is a schematic drawing, partly in section, showing two hydraulic motors connected together to drive a single output shaft, one of which is damaged.

Referring now to FIG. 1, a pair of hydraulic motors 10 and 12 are shown consisting of cylinders 14 and 16 containing pistons 18 and 20 fastened to actuating rods 22 and 24 respectively. Rods 22 and 24 are attached to a whippletree linkage 26 such that they drive a control rod 28 connected to a control surface, not shown. Cylinder 14 includes ports 30 and 32 for ingress and egress of hydraulic fluid and cylinder 16 includes similar ports 33 and 35. It will be observed that cylinder 14 is damaged, as by penetration of a projectile, and the metal of the housing has been petalled or deformed inwardly as shown at numeral 38.

Figure 2:
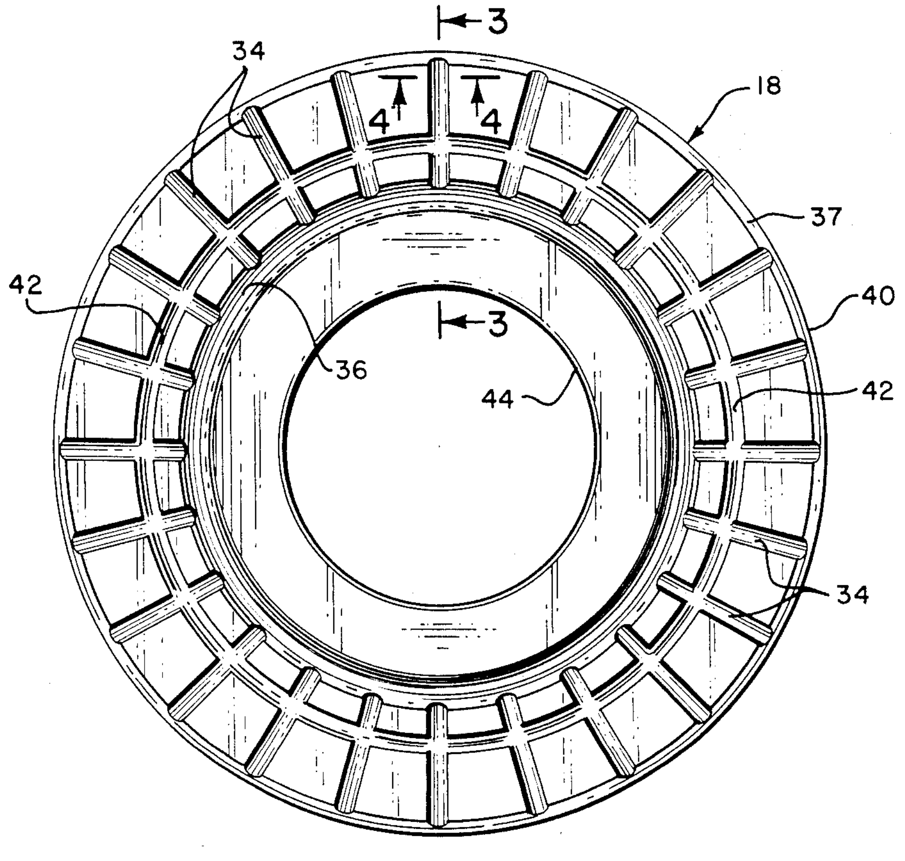
FIG. 2 is a plan view of a piston for a hydraulic motor according to my invention.

FIG. 2 is a plan view of approximately one half of the face of the piston 18. Since it is symmetrical it appears the same top and bottom and on both sides. Each face has a plurality of radial grooves 34 which extend between a deep circumferential groove 36 and a tapered surface 37 adjacent the peripheral cylindrical surface 40 of the piston 18. A second circumferential groove 42 is positioned radially outwardly of groove 36 such that it intersects all of the radial grooves 34. A central aperture 44 receives the actuating rod 22 to which the piston 18 is fastened by any suitable means such as by a diffusion welding technique or by nuts threadedly engaged with the rod.

Figure 3:
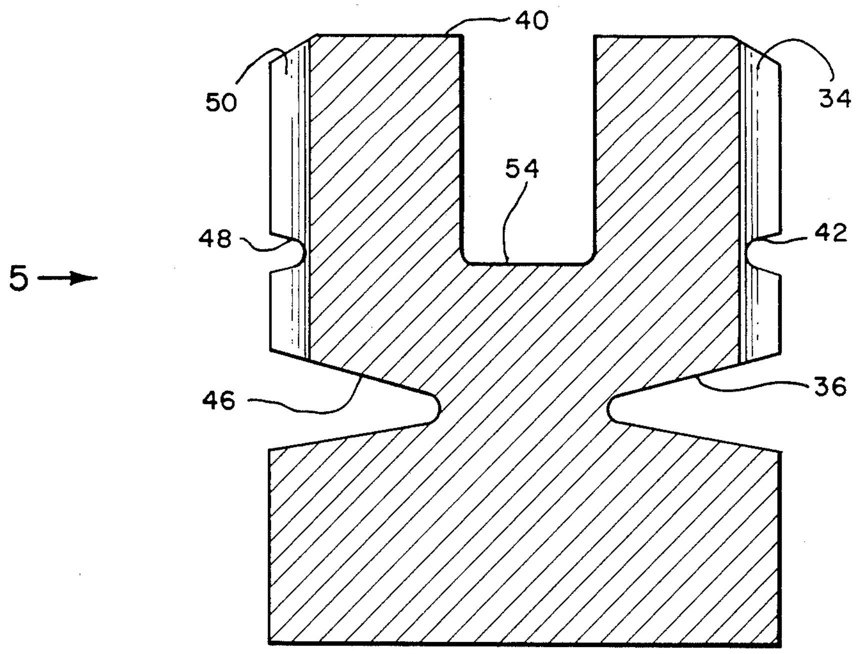
FIG. 3 is a sectional view taken along line 3—3 of FIG. 2.

FIG. 3 is a sectional view taken along line 3—3 of FIG. 2. From this view it will be seen that piston 18 includes, on one face, a deep circumferential groove 36 and, on the opposite face, an essentially identical groove 46. Radially outwardly thereof on each side are circumferential grooves 42 and 48. This section is taken through a pair of the radial grooves 34 and 50. Centrally located on the cylindrical outer surface 40 is a conventional seal groove 54 which is cut or otherwise formed to a desired depth. The radial position of circumferential grooves 42 and 48 is preferably chosen to correspond with the bottom of seal groove 54.

Figure 4:
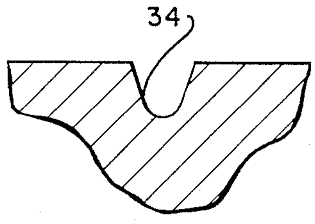
FIG. 4 is a fragmentary sectional view taken along line 4—4 of FIG. 2.

FIG. 4 is a partial sectional view taken along lines 4—4 of FIG. 2. This view shows the depth of one of radial grooves 34. As will be seen from FIG. 3, these radial grooves are located directly opposite radial grooves 50 and are of essentially the same depth as circumferential grooves 42 and 48.

Figure 5:
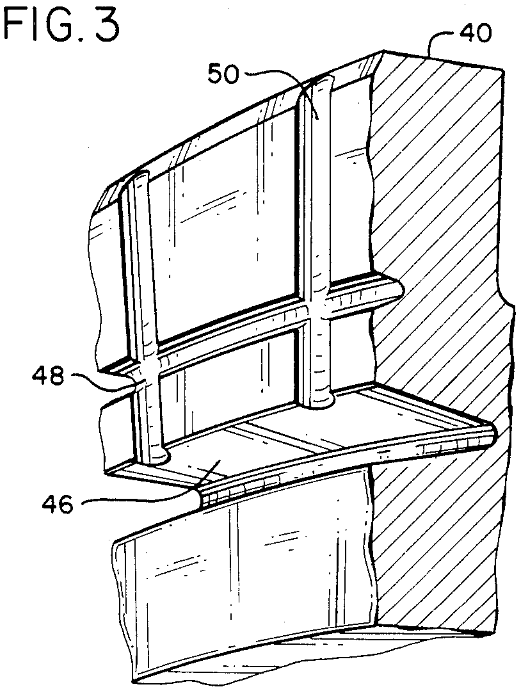
FIG. 5 is a perspective view of a part of one face of the piston of FIGS. 2 and 3 showing the pattern of grooves.

FIG. 5 is a perspective view of a fragmentary portion of the opposite face of piston 18 from that shown in FIG. 2. In this perspective view it will be quite clear how the radial grooves 50 intersect circumferential groove 48 and terminate at the deep inner circumferential groove 46 and at tapered surface 37.

From the foregoing it will be appreciated that the piston structure, in addition to being of relatively brittle material, is designed with selected weak portions so that small sectors (or truncated sectors) can break away from the periphery as required to clear any obstacle resulting from deformation or inwardly extending petalling of the cylinder wall. It may also have to break away to clear a spent projectile in the cylinder. In the event of such damage, and where two or more such motors are connected as shown in FIG. 1 or with a similarly redundant arrangement, the force of the remaining good motor or motors is available to pull the piston through the obstacle. When the piston makes contact with the obstacle this force is typically concentrated over a relatively small area which may not exceed that part of the piston circumference represented by one to three of the sectors defined by the radial grooves. This force will cause these sectors to break away, initially to the depth of grooves 42 and 48, and, if the obstacle extends so far into the cylinder, to the depth of grooves 36 and 46. Grooves 36 and 46 effectively reduce the piston thickness to approximately one third so that a substantial part of the piston may be caused to break away outside the radius of these deep grooves, if required to permit the piston to pass an obstacle. One existing specification for such motors specifies that a blocked piston must break and free itself at no more than 40% of system hydraulic pressure.

Numerous modifications will occur to those skilled in the art. While applicant has disclosed a matrix of 70–75% 6061 aluminum and 25–30% silicon carbide, other similar metal matrix materials will also serve, if they have the desired combination of adequate strength, coupled with brittleness. Some such materials, while operative, will be somewhat more difficult or expensive to form to the desired configuration. The depth and arrangement of the circumferential and radial grooves may vary somewhat depending on the dimensions of the seal groove and the characteristics of the metal matrix used.

I claim:

1. A linear hydraulic motor including a cylinder, a rod in said cylinder and a frangible piston having a seal groove formed on its cylindrical peripheral surface for receiving a conventional seal member, said piston being carried on said rod and dividing said cylinder into two chambers, said piston subject to being exposed to a differential of hydraulic pressure to cause it to carry said rod in one of two directions:

characterized in that said rod is of steel material, said piston is fastened to said rod and is of a material chosen to fracture under low stress and is configured with a large number of radial grooves effectively dividing the first and second faces of said piston into sectors, a first circumferential groove is formed on each of said faces of said piston and located radially inwardly frm said cylindrical peripheral surface at approximately thesame distance as the bottom of said seal groove, a second pair of circumferential grooves is formed on each of said piston faces and positioned coaxially radially inwardly of said first circumferential grooves, said second circumferential grooves being of substantially greater depth than said first circumferential grooves.

2. A linear hydraulic motor as claimed in claim 1 wherein said second circumferential grooves are directly opposite each other and the web between said grooves is approximately one-third the maximum thickness of said piston from one face to the other.

3. A linear hydraulic motor as claimed in claim 2 wherein the bottoms of said second circumferential grooves are somewhat closer to the bottom of said seal groove than are the bottoms of said first circumferential grooves.

4. A linear hydraulic motor as claimed in claim 1 wherein the pattern of said radial and circumferential grooves is substantially the same on each side of said piston with corresponding grooves directly opposite each other.

5. A linear hydraulic motor as claimed in claim 4 wherein the depth of said first circumferential groove on each face is approximately the same as the depth of said radial grooves.

6. A linear hydraulic motor as claimed in claim 4 wherein said frangible piston is formed of a metal matrix composite of aluminum and silicon carbide.

* * * * *